United States Patent
Engbersen et al.

(10) Patent No.: US 6,996,116 B2
(45) Date of Patent: Feb. 7, 2006

(54) SWITCHING NODES AND INTERFACE MODULES FOR DATA NETWORKS

(75) Inventors: Ton Engbersen, Feusisberg (CH); Ronald P. Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/991,295

(22) Filed: Nov. 21, 2001

(65) Prior Publication Data

US 2002/0080775 A1 Jun. 27, 2002

(30) Foreign Application Priority Data

Nov. 22, 2000 (EP) .................................. 00811109

(51) Int. Cl.
*H04L 12/56* (2006.01)

(52) U.S. Cl. ...................................... 370/419; 370/465

(58) Field of Classification Search ................ 370/352, 370/359, 388, 389, 400, 401, 419, 463, 465, 370/360, 392; 710/305
See application file for complete search history.

(56) References Cited

U.S. PATENT DOCUMENTS

| | | | | |
|---|---|---|---|---|
| 5,689,506 A | * | 11/1997 | Chiussi et al. | 370/388 |
| 5,953,314 A | * | 9/1999 | Ganmukhi et al. | 370/220 |
| 5,983,260 A | * | 11/1999 | Hauser et al. | 709/201 |
| 6,697,362 B1 | * | 2/2004 | Akella et al. | 370/389 |
| 6,829,666 B1 | * | 12/2004 | Deneroff et al. | 710/305 |

* cited by examiner

*Primary Examiner*—Man U. Phan
*Assistant Examiner*—Toan D. Nguyen
(74) *Attorney, Agent, or Firm*—Douglas W. Cameron; Anne Vachon Dougherty

(57) ABSTRACT

An interface module is provided for connecting a data communications link to a switching node, comprising a plurality of other interface modules, of a data communications network. The interface module has at least one external port for connection to a data communications link, and a plurality of internal ports for connection to respective internal ports of the switching node. A link interface is connected to the external port for processing inbound and outbound data. A switch circuit is connected between the link interface and the internal ports of the module for transmission of data between the internal ports and to the link interface. The module includes a controller for controlling routing of data via the internal ports in accordance with an intra-node routing protocol. Switching nodes comprising a plurality of interface modules, and optionally one or more switching modules, are provided.

16 Claims, 5 Drawing Sheets

INTERFACE CARDS  SWITCH CARD

SWITCHING NODES AND INTERFACE MODULES FOR DATA NETWORKS

FIELD OF THE INVENTION

This invention relates generally to switching nodes and interface modules for connecting data communications links to switching nodes in data communications networks.

BACKGROUND OF THE INVENTION

In a typical data communications network, one or more switching nodes will be provided to interconnect multiple data communications links which may themselves be connected to other switching nodes or to one or more end-system devices, for example in a network segment or subnetwork. Numerous types of switching node (often referred to simply as a "switch") are known in the art, from simple Ethernet switches to ATM switches for example. The basic switching mechanism can vary accordingly, for example from a simple bus system to a more complex switch fabric comprising a set of interconnected switching components forming a multi-stage switch, using chips such as IBM's Prizma switch for example. (IBM is a trade mark of International Business Machines Corporation). Whatever the underlying switching system, the basic function of the switching node is the same, namely to provide for transport of data between the data communications links connected to the node. In practice, the data links are connected to the ingress/egress points, or ports, of the switching node via an interface module which is typically provided in the form of an interface card as illustrated schematically in FIG. 1 of the accompanying drawings. Here, three interface cards 1 are shown connected to a switch card 2, which provides the switching mechanism of the node, via a backplane 3. FIG. 2 of the drawings shows an equivalent block diagram. Each interface card 1 has a number of "external" ports 4 for connection to respective data communications links 5. Only one external port per card is shown for simplicity here, though in practice each interface card will typically have multiple external ports, and a similar number of "internal" ports 6 are provided on the card for connection to the switch 2. These internal ports thus serve in effect as the ports of switch 2. A link interface 7 is provided on each card between the external ports 4 and internal ports 6, the link interface 7 comprising various circuitry for handling communication of data between the links 5 and the switch 2. Typical functions of the link interface 7 include, for example, data buffering, media access control, error detection and recovery, and cross-switch routing functions for routing inbound data, received from a link 5, to the appropriate outbound port of the switch in accordance with a routing table maintained in a memory of the interface. The appropriate outbound port is determined from the routing table based on the destination address of the inbound data, indicated in a header for example, and a destination port identifier is typically added to the data to indicate the appropriate outbound port. In addition, where a different data communications format is used on a data link 5 to that used for communications across the switch fabric, the interface includes communications adapter functions for appropriate format conversion of inbound and outbound data, such as segmentation and reassembly in the case of an ATM switch for example. Interface cards which provide such communications adapter functions are often referred to as adapter cards, or simply "adapters".

In the existing systems as described above, the switch 2 provides support for a certain number of ports, and interface cards can be added as network demands grow. However, when the full switch capacity is used by the interface cards, the switch fabric must be extended, for example by adding new switch cards in the scenario of FIG. 1. Complex multi-stage arrangements can be employed to extend the switch fabric, but the number of ports and hence interface cards that can be connected is still inherently limited, each additional interface card using up more of the switch capacity as the network develops. Moreover, failure of part of the switch fabric can have serious effects on network efficiency and correcting such faults can be a complex task.

SUMMARY OF THE INVENTION

According to one aspect of the present invention there is provided an interface module for connecting a data communications link to a switching node, comprising a plurality of other such interface modules, of a data communications network, the interface module comprising:

an external port for connection to a data communications link;

a plurality of internal ports for connection to respective internal ports of said other interface modules of the switching node;

a link interface, connected to the external port, for processing inbound data for forwarding across the switching node and outbound data for transmission over said link;

a switch circuit, connected between the link interface and the internal ports of the module, for transmission of data between the internal ports of the module and between the internal ports and the link interface; and a controller for controlling routing of data via the internal ports of the module in accordance with an intra-node routing protocol governing routing of data across the intra-node network of interconnected interface modules of the switching node.

Thus, in addition to the usual link interface for the external ports, interface modules embodying the invention include a switch circuit connected between the link interface and the internal ports of the module. The internal ports can be connected, directly or indirectly, to internal ports of other, similar interface modules such that the overall switching node comprises an intra-node network of interconnected interface modules. A controller on each interface module controls routing of data via the internal ports of the module in accordance with an intra-node routing protocol for this intra-node network. Each interface module thus contributes some switching capacity to the switching node by virtue of its own switch circuit, and these switch circuits are "networked" into the node via the internal ports of the module. This allows every external port to be matched by internal bandwidth, since as new interface modules are connected to the node to support additional links, additional bandwidth is provided by the switch circuits on the new interface modules. Theoretically, therefore, there is no limit to the growth of the node's throughput. Moreover, in contrast to the fixed interconnection mechanism provided by existing switch systems, the interface modules can be interconnected in numerous configurations via their internal ports. The intra-node network thus provides a highly flexible interconnection mechanism in which multiple paths can be provided between any given pair of interface modules. Faults in any particular module need not render the node inoperative, and can be easily corrected by replacing the individual faulty module.

Overall, therefore, embodiments of the invention provide for a highly flexible, modular and robust switching node arrangement with extraordinary scalability for coping with increasing network demands.

While interface modules embodying the invention have a plurality of internal ports for connection in the intra-node network, in general one or more external ports may be provided for connection to external links. Clearly the ratio of the numbers of internal and external ports can vary, though ideally a relatively low percentage of the module's own switching capacity is used by the external ports, the remainder contributing, via the internal ports, to the switching capacity of the intra-node network as a whole.

Interface modules embodying the invention may conveniently be embodied as interface or adapter cards for interconnection via a backplane as described above for example, though clearly the module itself and the physical interconnection mechanism can be implemented in numerous ways and are not critical to the basic operation. Similarly, the switching circuit on the module can take any desired form, the particular nature of the switch fabric, whether it be a simple bus or a multistage switch arrangement, being orthogonal to the underlying principles of the invention. Moreover, the invention is similarly independent of the particular routing protocol utilized in the intra-node network and implemented by the controllers of the interface modules. Various existing routing protocols can be employed, and in general a suitable routing protocol can be selected according to the particular requirements of a given system.

The invention also provides a switching node for a data communications network, the switching node comprising a plurality of interface modules as described above, wherein at least some of the internal ports of each interface module are connected to respective internal ports of at least one other interface module. In particular, another aspect of the present invention provides a switching node for a data communications network, the switching node comprising a plurality of interface modules for connecting data communications links to the switching node, wherein:

each interface module comprises at least one external port for connection to a data communications link, a plurality of internal ports, a link interface, which is connected to said at least one external port, for processing inbound data for forwarding across the switching node and outbound data for transmission over the link, a switch circuit, which is connected between the link interface and the internal ports of the module, for transmission of data between the internal ports of the module and between the internal ports and the link interface, and a controller for controlling routing of data via the internal ports of the module;

at least some of the internal ports of each interface module are connected to respective internal ports of one at least one other said interface module whereby the interface modules are connected in an intra-node network;

and wherein the controller of each interface module is arranged to control said routing of data in accordance with an intra-node routing protocol governing routing of data across said intra-node network.

In general in switching nodes embodying the invention, the internal ports of a given interface module may be connected directly or indirectly to internal ports of other interface modules. In particular, it may be desirable in some systems to provide additional switching capacity in the intra-node network by means of "internal switching modules". Such a switching module may comprise a plurality of internal ports, a switch circuit for transmission of data between the internal ports of the switching module, and a controller for controlling routing of data via the internal ports of the switching module in accordance with the intra-node routing protocol. Thus, the switching module can be generally similar to an interface module, but without the external ports and link interface for connection to external network links. Switching nodes embodying the invention may include one or more such switching modules, at least some of the internal ports of the or each switching module being connected to respective internal ports of a plurality of other, interface or switching, modules. Particular examples of such switching modules will be described in more detail below.

The invention also extends to a data communications network including one or more switching nodes as described above.

BRIEF DESCRIPTION OF THE DRAWINGS

Embodiments of the invention will now be described, by way of example, with reference to the accompanying drawings in which.

DETAILED DESCRIPTION OF THE INVENTION

Figure 3:
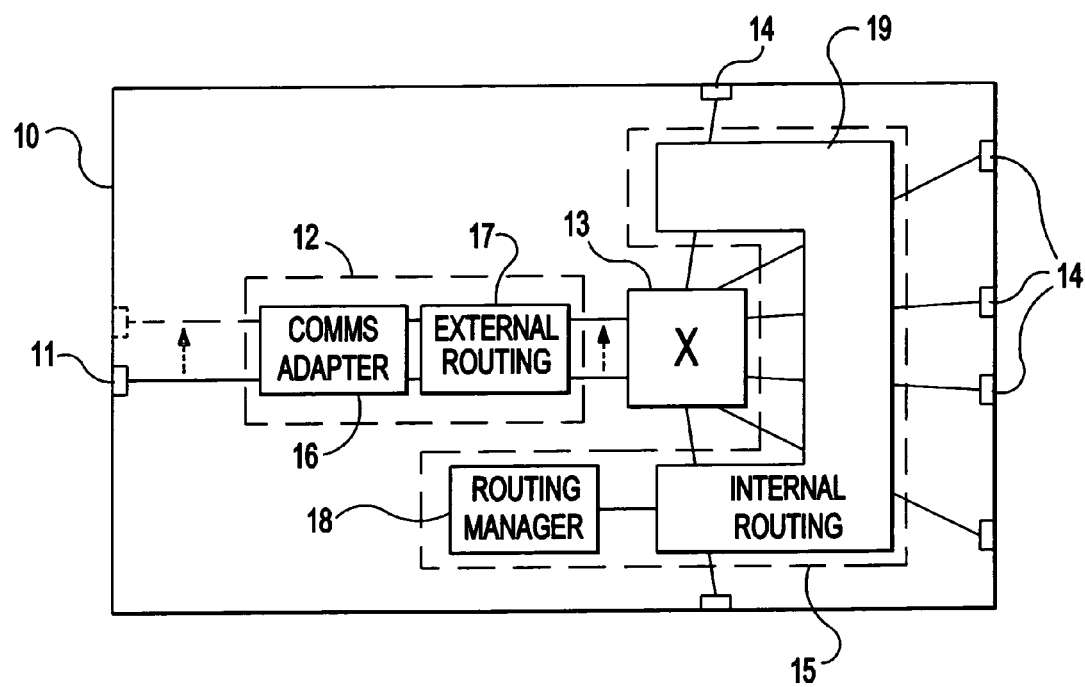
FIG. 3 is a schematic illustration of an interface module embodying the invention.

FIG. 3 shows an example of an interface module embodying the invention in the form of an adapter card 10. The adapter 10 has an external port 11 for connection in use to a data communications link (not shown). While a single external port is described here for simplicity, in practice the adapter may have more than one external port as indicated by the broken lines in the figure. A link interface, indicated generally at 12, is connected between the (or each) external port 11 and an internal switch circuit indicated here by switch 13. The particular switching mechanism of the switch circuit is not critical to the basic operation described below, and it will be appreciated by those skilled in the art that various known switch circuits, whether comprising a single switch or a multistage switch arrangement, could be employed as switch 13 according to requirements. The (or each) external port 11 is connected via link interface 12 to one port of switch 13 as indicated in the figure, and the remaining switch ports are connected to respective internal ports 14 of the adapter via a controller indicated generally at 15.

Figure 1:
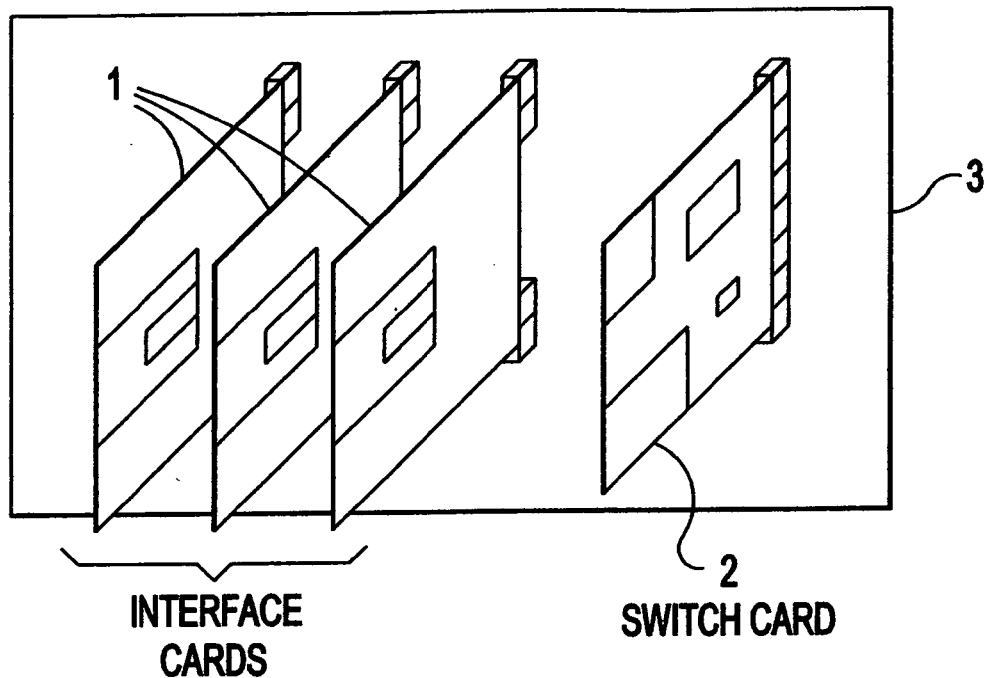
FIG. 1 illustrates a simple example of a prior switching node system.
Figure 2:
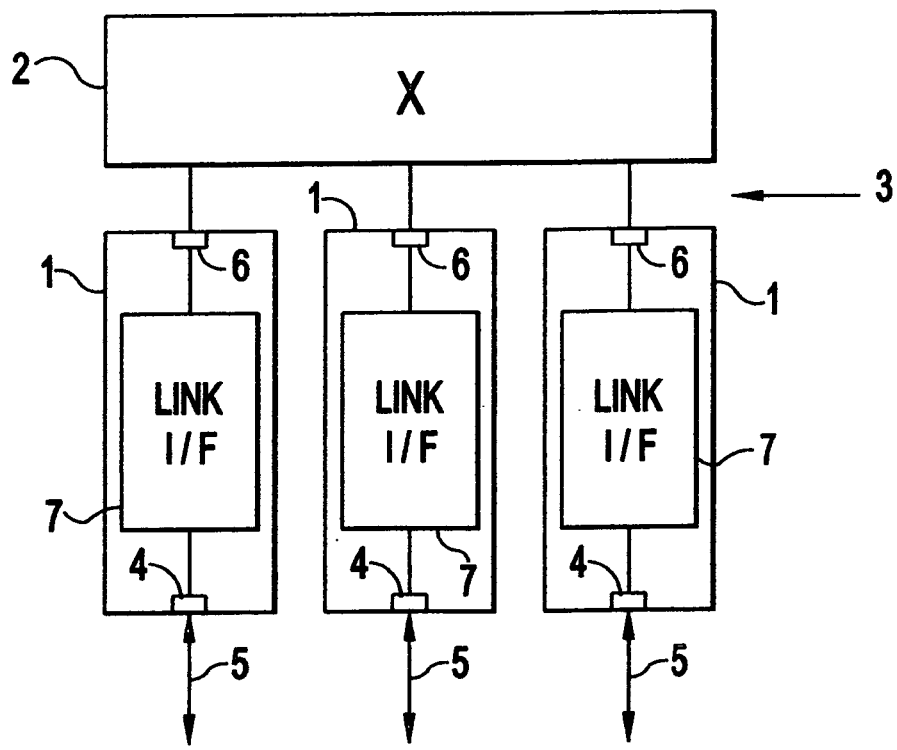
FIG. 2 is a block diagram of the system of FIG. 1.

The link interface 12 includes various circuitry for handling communication of data between the external port(s) 11 and the switch 13. This link interface circuitry can be of known form, corresponding generally to the circuitry of link interfaces 7 in the prior system of FIG. 2, and need not be described in detail here. However, two particular components of the interface 12 are indicated in the figure as a communications adapter component 16 and an "external routing" component 17. Communications adapter 16 performs the format conversion of data between the link data format(s), employed on the data link(s) connected to the external port(s) 11 in use, and the switch data format used for transport of data across the switch 13. (Unless the context otherwise requires, the term "data" is used herein in the general sense of a data communication, such communications generally being formatted in blocks such as packets, frames, cells etc. including both control data, e.g. headers etc., and actual or "payload" data). The implementation details of communications adapter 16 will thus depend on the particular communications formats employed, and suitable implementations for the various formats are known in the art. The external routing component 17 corresponds generally to the routing component of link interface 7 in the prior system of FIG. 2 discussed above, and operates to add routing information, identifying the appropriate outbound port, to data to be transmitted across the switching node. As discussed further below, however, the switching node here comprises a network of interconnected interface modules similar to adapter 10, rather than simply a switch 2 as in FIG. 2.

Figure 4:
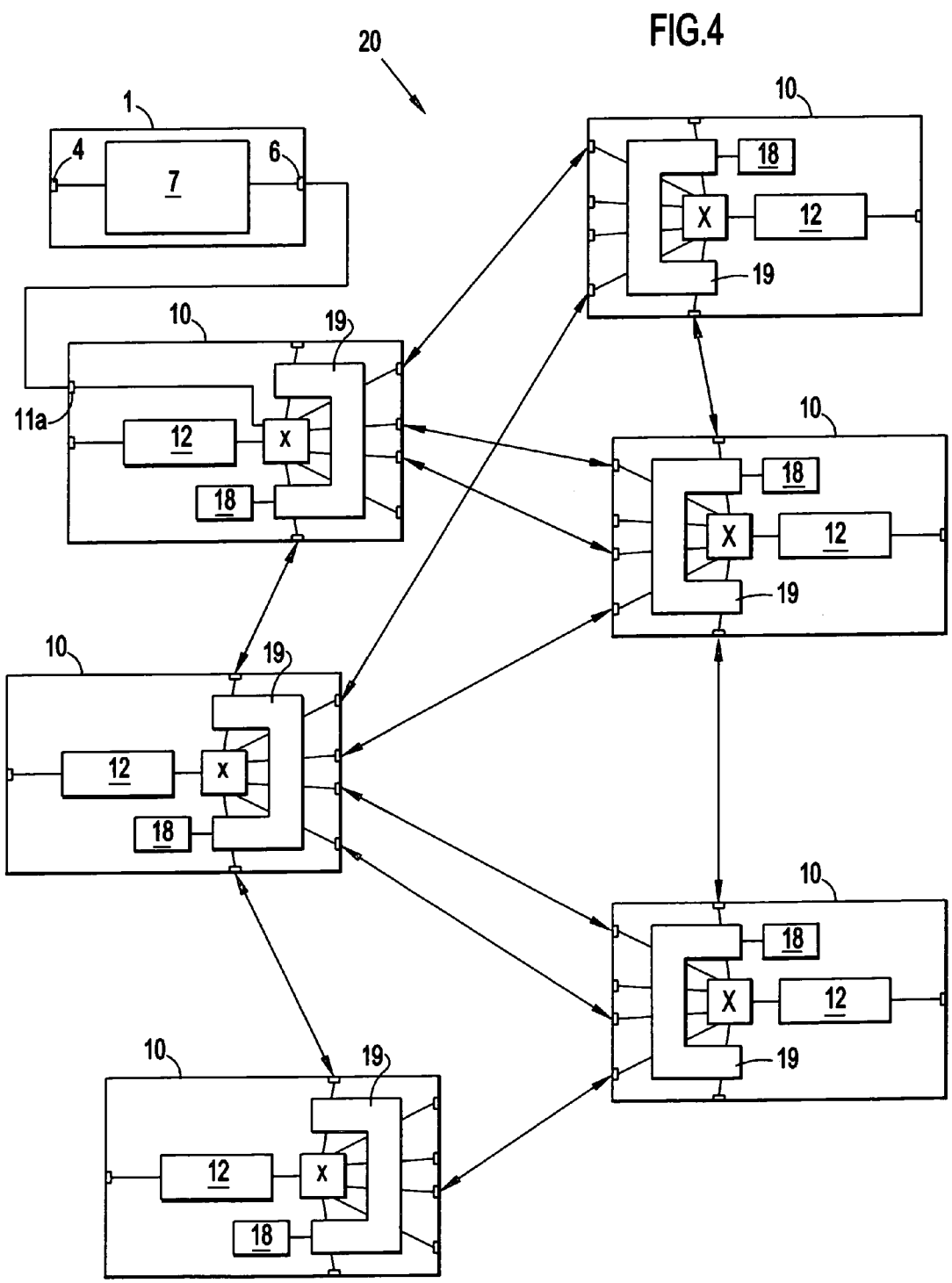
FIG. 4 is a schematic illustration of a switching node embodying the invention.

The controller 15 of adapter 10 is illustrated here as comprising a routing manager 18 and an internal routing component 19 which is connected between the internal ports 14 of the adapter and the corresponding ports of switch 13. The function of controller 15 is to control routing of data via the internal ports 14 when the adapter 10 is connected to a switching node embodying the invention. One example of such a switching node is illustrated in FIG. 4. In this embodiment, the switching node 20 consists of a plurality of adapters 10 as described above, six adapters being shown in this simple example. Some of the internal ports 14 of each adapter 10 are connected to respective internal ports of other adapters, so that the switching node 20 effectively consists of an intra-node network of interconnected adapters. Data can be communicated between the adapters 10 via multiple paths across this intra-node network, either directly, where a direct link is provided, or indirectly, passing through one or more other adapters on the way.

Routing of data in the intra-node network of switching node 20 is governed by an intra-node routing protocol implemented by the controllers 15 of adapters 10. The routing protocol may be a known protocol, such as IP (Internet Protocol), OSPF (Open Shortest Path First), PNNI (Private Network to Network Interface), etc., or any other protocol which provides for routing of data across the network to the appropriate adapter 10 for onward transmission via the outgoing data links. Thus, the particular routing protocol employed in the intra-node network is not central to operation of embodiments of the invention, and need not be discussed in detail here. In general, however, the routing managers 18 of adapters 10 are configured to communicate with one another so that each routing manager 18 maintains up-to-date topology information defining the topology of the intra-node network. Such topology information can be stored in internal memory, for example in the form of routing tables or other data structures which identify the adapters 10 and the links between adapters in the intra-node network. The details of the protocol relating to forwarding of data in the intra-node network are implements in this embodiment by the internal routing components 19 of adapters 10 using the topology data stored by their respective routing managers 18. The internal routing components 19 themselves can be implemented in various ways depending on the particular protocol employed in the system, and suitable implementations will be apparent to those skilled in the art. Briefly, however, each internal routing component will typically include store-and-forward circuitry for buffering and forwarding of data via switch 13 between the internal ports 14 and between the internal ports and the link interface 12 of the adapter. In addition, the routing component 19 will typically include logic for generating and processing internal routing information in accordance with the intra-node routing protocol. An example of the basic functions performed by routing component 19 will be given in the following description of overall operation of the switching node.

On receipt of inbound data at an external port 11 of adapter 10, format conversion is performed by communications adapter 16 as described above, and then external routing information is added by external routing component 17. Routing component 17 operates generally as in prior adapters, except that here the outbound switch port identified by the routing information corresponds to an external port of another adapter 10. Thus, in operation, component 17 builds up an "external routing table" in the usual way, the addresses of network devices being associated in the table with respective port ids identifying the particular external ports of the switching node which give access to these devices in the data communications network. On receipt of data addressed to a particular network device, component 17 determines from its routing table the appropriate external port for the destination device address, and adds the port id to the data as "external" routing information. Next, the data (including the external routing information) is transmitted via switch 13 to the internal routing component 19 which determines how to forward the data towards its destination. Thus, on receipt by routing component 19, the routing logic determines, based on the destination external port id and the topology data stored in manager 18, the appropriate route for forwarding the data across the intra-node network. The details of this process will again depend on the particular routing protocol employed. By way of example, however, the process could be as simple as selecting the appropriate internal port 14 of the adapter for forwarding of the data to the appropriate next adapter in the intra-node network, and adding internal routing information to identify this next adapter as the next recipient. In a more sophisticated process for example, component 19 may select a path for routing the data across the intra-node network, based on the current state of the network as identified by the topology information stored in manager 18, and add internal routing information to identify this path to subsequent adapters in the path. In any case, it will be appreciated that, as with other types of network, the routing process can provide support for load balancing, quality-of-service, class-of-service requirements etc., where the intra-node protocol so provides.

On receipt of data from the intra-node network at an internal port of the adapter, the internal routing component can determine, e.g. from the external routing information, whether the data is for outbound transmission via an external port of the adapter, and if so the data is forwarded via switch 13 to link interface 12 for onward transmission via the appropriate port 11. If the routing information indicates that the data is for onward transmission in the intra-node network, then component 19 again selects the appropriate internal port 14 for forwarding of the data based on the topology information maintained by manager 18, adding additional routing information for the next stage of the path if necessary. The data is then forwarded via switch 13 to the appropriate internal port 14 for onward transmission.

The advantages of such a switching node structure will be apparent from the foregoing. Each adapter contributes some switching capacity to the switching node via its internal switch 13, so that the switching capacity grows as network demands increase and additional adapters are connected to the node. In preferred embodiments of the adapters 10, a relatively small percentage, say 10 to 30%, of the capacity of the switch 13 on the adapter is used for communications via the external ports 11, the remainder being used via the internal ports 14 to network the adapter into the switching node. The intra-node network structure is highly flexible and can provide for alternative routing of data in the case of failure of a particular adapter module or intra-node link to give a high degree of fault tolerance. The modular nature of the node allows repairs to be carried out simply by replacing faulty adapters. Overall therefore a highly efficient, highly scaleable switching node structure is provided, resembling the Internet of today which has proven robustness and scalability. It is also a simple matter to migrate existing adapters, as described above with reference to FIG. 2, into the switching node structure. An example of this is shown in FIG. 4 where an existing adapter 1 is connected to the switch 13 of one of the adapters 10 via an external port of the adapter 10. In this example, a dedicated external port 11a, which is connected directly to switch 13, is provided for this purpose in adapter 10. Clearly, however, the link interface 12 of the adapter 10 could be configurable to provide a direct connection between one or more of its external ports and switch 13 where these external ports are to be used for integrating existing adapters 1 into the system.

Figure 5:
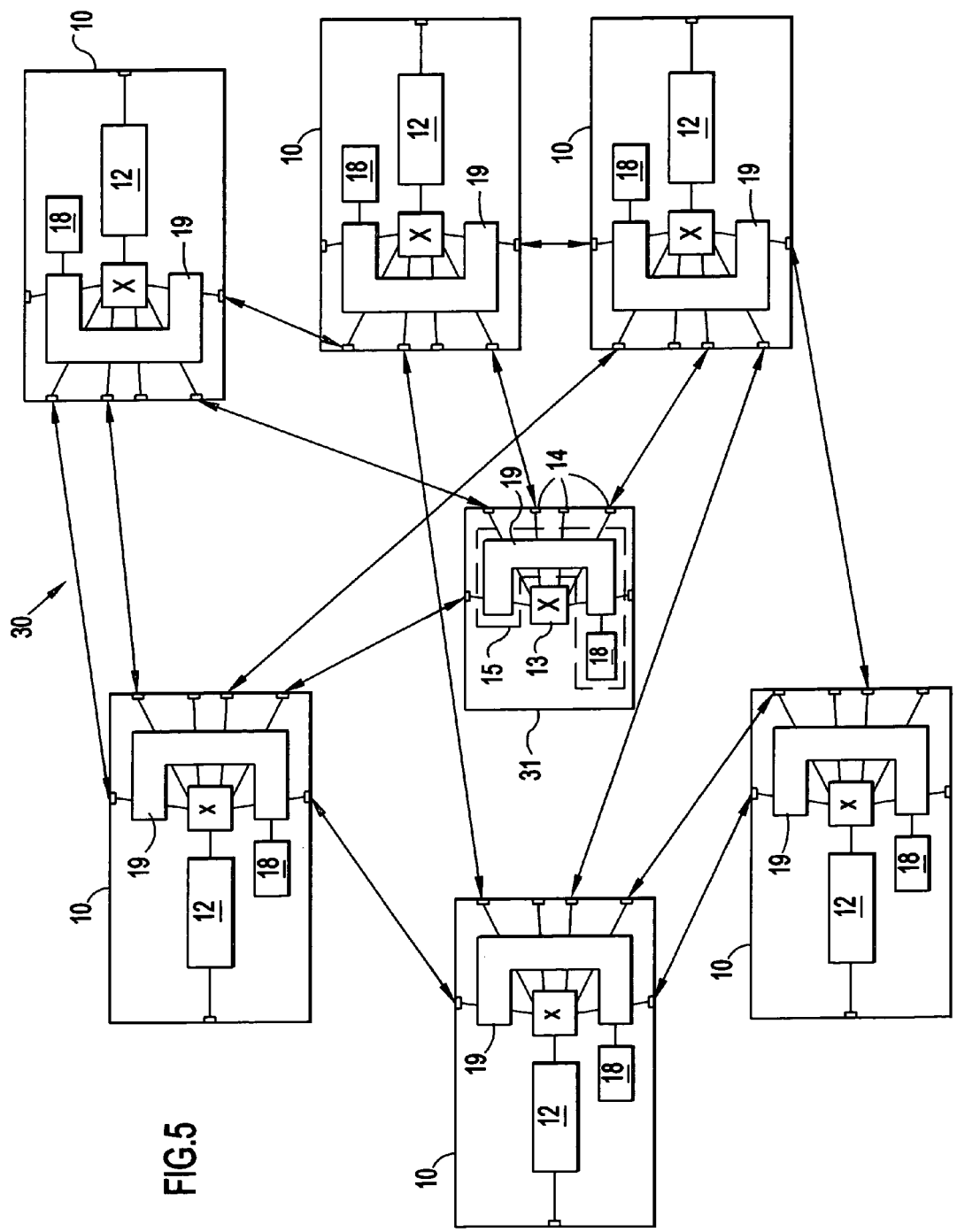
FIG. 5 illustrates another example of a switching node embodying the invention.

In the example of FIG. 4, the switching node 20 consists simply of the set of interconnected adapters 10. FIG. 5 shows another embodiment of a switching node 30 where a switching module 31 is connected in the intra-node network. Switching module 31 in this embodiment is generally similar to an adapter 10 as described above, and like elements are labeled accordingly. However, switching module 31 has no link interface 12 or external ports 11, and thus does not provide for connection of data communications links to the node. A number of the internal ports 14 of the switching module are connected to respective internal ports of adapter modules 10, and apart from the link interface function, the switching module 31 operates in the same way as the adapters 10 as described above. Thus, switching module 31 simply provides additional switching capacity in the intra-node network. Again, the switching module can conveniently be provided in the form of a card similar to adapter cards 10, though other embodiments can of course be envisaged. Further, while a single switching module is shown in this example, in general one or more such switching modules can be utilized as required, each switching module being connected via its internal ports to a plurality of other modules, whether adapter modules 10 or switching modules 31.

Figure 6:
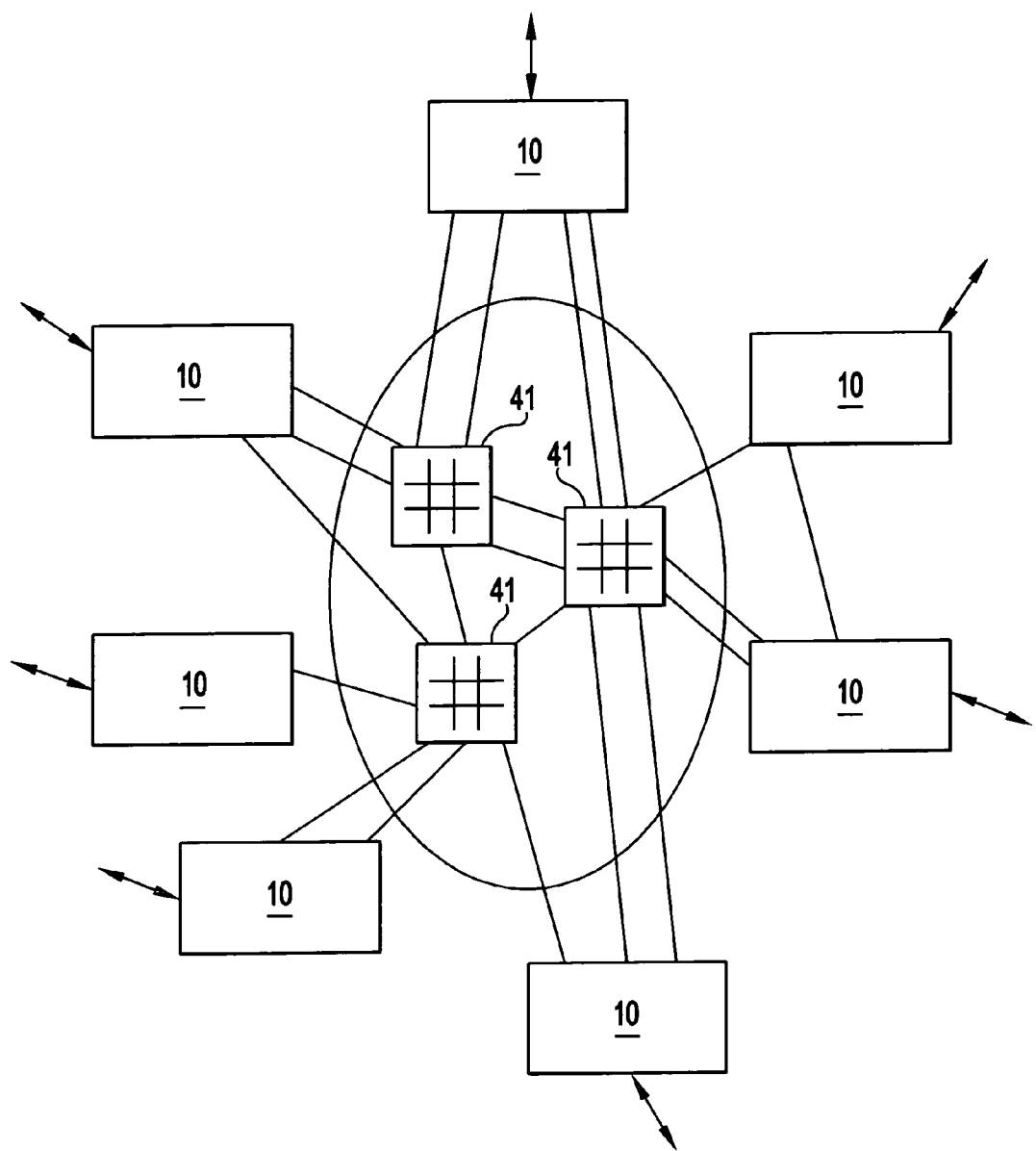
FIG. 6 illustrates a further example of a switching node embodying the invention.

The above description of switching modules 31 assumes that each switching module 31 provides for packet-switching of data in the same way as the adapters 10. Thus, in the embodiment described above it is assumed that the switch circuit 13 of each interface and adapter module comprises an electrical switch. However, alternative arrangements can be envisaged, and an example will now be described with reference to FIG. 6. The switching node 40 of this figure includes a network of interconnected adapters 10 as before, but here the adapters are interconnected via optical switching modules 41. These switching modules 41 are broadly similar to switching modules 31 (and corresponding parts will be referred to by like reference numerals), but here the switch circuit 13 of the module is implemented as an optical switch and no packet switching is performed by these modules. Optical switches are so-called "provisioning" or configurable switches in that they establish paths for data transport, these paths being configured for the duration of the connection, typically several hundred milliseconds. However, per-packet storage and forwarding of data is not usually supported. The optical switching modules 41 still include a controller 15 for maintaining topology information and controlling routing of data via the internal ports in accordance with an intra-node routing protocol. Here, however, per-packet storage and forwarding of data, as performed by internal routing component 19 of the electrical switching module 31, is not provided. Instead, the controller 15 of each optical switching module 41 controls configuration of the optical switch 13, setting the fixed interconnects so as to route data via the appropriate ports 14. Configuration of the optical switch is performed in response to call setup requests which are issued by the routing components of adapters 10 under a call setup procedure of the intra-node routing protocol. As part of this call setup procedure in the switching module 41, the module's controller 15 will select, based on the topology data maintained by the controller, the appropriate internal port for routing of the call in a similar manner to the controllers 15 of electrical switching modules 31, but the path selection process here is performed in advance of the call and the optical switches are configured accordingly for the duration of the call. Opto-electrical conversion can be performed, for example, at the internal ports of the adapter cards 10 or on a backplane via which the adapters are connected to the switching modules 41. Again, the switching modules 41 can conveniently be provided in the form of switching cards for connection in the intra-node network as required.

In this embodiment, therefore, the "core" 42 of the switching node provides for provisioning and transport of data across the intra-node network in a highly flexible manner, since the interconnection pattern between the adapters 10 is not fixed but can be adapted (every few seconds or so) to fluctuations in traffic demand. The area around the core 42, comprising the adapters 10, is where the per-packet switching and forwarding of data is performed. Depending on the provisioning of the optical switches for a call, a single packet may pass directly across the core, or it may be routed via one or more other adapters in the intra-node network and thus pass through additional stages of electrical switching. Each adapter 10 thus contributes some electrical switching to the core as well as providing electrical switching on behalf of the adapter itself as described above. As before, therefore, additional switching capacity is added to the switching node each time a new adapter is connected. In addition, the rather rigid interconnection patterns provided by existing multistage switch arrangements are replaced here by a highly flexible, changeable (provisionable) interconnection pattern.

It will of course be appreciated that, while particular embodiments of the invention have been described in detail above, many changes and modifications can be made to these embodiments without departing from the scope of the invention.

We claim:

1. An interface module claim for connecting a data communications link to a switch node, comprising a plurality of other interface modules, of a data communications network, the interface module comprising:
   an external port for connection to the data communications link;
   a plurality of internal ports for connection to respective internal ports of said other interface modules of the switching node;

a link interface, connected to the external port, for processing inbound data for forwarding across the switching node and outbound data for transmission over said data communications link;

a switch circuit, connected between the link interface and the internal ports of the interface module, for transmission of data between the internal ports of the interface module and between the internal ports and the link interface; and a controller for controlling routing of data via the internal ports of the interface module in accordance with an intra-node routing protocol governing routing of data across an intra-node network of interconnected interface modules of the switching node, wherein the link interface comprises an external routing component for adding external routing information to data to be forwarded across the switching node in dependence on a destination address indicated by the data to be forwarded, said external routing information indicating an external port of one of said other interface modules of the switching node to which the data is to be forwarded.

2. The interface module according to claim 1 including a plurality of external ports for connection to respective data communications links, wherein the link interface is connected to each of the external ports for processing said inbound and outbound data.

3. The interface module according to claim 2 including at least one of the plurality of external ports which is connected or connectable directly to the switch circuit.

4. The interface module according to claim 1, wherein the link interface comprises a communications adapter for format conversion between a link data format for the external port, for data communications over a link connected to the external port in use, and a switch data format for said data communications across the switching node.

5. An interface module for connecting a data communications link to a switch node, comprising a plurality of other interface modules, of a data communications network, the interface module comprising:

an external port for connection to the data communications link;

a plurality of internal ports for connection to respective internal ports of said other interface modules of the switching node;

a link interface, connected to the external port, for processing inbound data for forwarding across the switching node and outbound data for transmission over said data communications link;

a switch circuit, connected between the link interface and the internal ports of the interface module, for transmission of data between the internal ports of the interface module and between the internal ports and the link interface; and a controller for controlling routing of data via the internal ports of the interface module in accordance with an intra-node routing protocol governing routing of data across an intra-node network of interconnected interface modules of the switching node, wherein the controller comprises an internal routing manager for maintaining topology information indicative of the topology of the intra-node network, and an internal routing component for selecting, in dependence on said topology information, the internal port of the interface module for forwarding of data across the intra-node network in accordance with the intra-node routing protocol.

6. The interface module according to claim 5, including a plurality of external ports for connection to respective data communications links, wherein the link interface is connected to each of the external ports for processing said inbound and outbound data.

7. The interface module according to claim 6 including at least one of the plurality of external ports which is connected or connectable directly to the switch circuit.

8. The interface module according to claim 5, wherein the link interface comprises a communications adapter for format conversion between a link data format for the external port, for data communications over a link connected to the external port in use, and a switch data format for said data communications across the switching node.

9. An interface card comprising an interface module for connecting a data communications link to a switch node, comprising a plurality of other interface modules, of a data communications network, the interface module comprising:

an external port for connection to the data communications link;

a plurality of internal ports for connection to respective internal ports of said other interface modules of the switching node;

a link interface, connected to the external port, for processing inbound data for forwarding across the switching node and outbound data for transmission over said data communications link;

a switch circuit, connected between the link interface and the internal ports of the interface module, for transmission of data between the internal ports of the interface module and between the internal ports and the link interface; and a controller for controlling routing of data via the internal ports of the interface module in accordance with an intra-node routing protocol governing routing of data across an intra-node network of interconnected interface modules of the switching node;

wherein the link interface comprises an external routing component for adding external routing information to data to be forwarded across the switching node in dependence on a destination address indicated by the data to be forwarded, said external routing information indicating an external port of one of said other interface modules of the switching node to which the data is to be forwarded.

10. A switching node for a data communications network, the switching node comprising a plurality of interface modules for connection data communications links to the switching node wherein:

each interface module comprises at least one external port for connection to the data communications link, a plurality of internal ports, a link interface which is connected to said at least one external port, for processing inbound data for forwarding across the switching node and outbound data for transmission over said data communications link, a switch circuit, which is connected between the link interface and the internal ports of the interface module, for transmission of data between the internal ports of the interface module and between the internal ports and the link interface, and a controller for controlling routing of data via the internal ports of the interface module, wherein the link interface comprises an external routing component for adding external routing information to data to be forwarded across the switching node in dependence on a destination address indicated by the data to be forwarded, said external routing information indicating an external port of one of said other interface modules of the switching node to which the data is to be forwarded;

at least some of the internal ports of said each interface module are connected to respective internal ports of one at least one other said each interface module whereby the interface modules are connected in an intra-node network;

and wherein the controller of each interface module is arranged to control said routing of data in accordance with an intra-node routing protocol governing routing of data across said intra-node network.

11. The switching node according to claim 10 wherein:

the switching node includes at least one switching module comprising a plurality of internal ports, a switch circuit for transmission of data between the internal ports of the switching modules, and a controller for controlling routing of data via the internal ports of the switching module in accordance with said intra-node routing protocol; and at least some of the internal ports of the switching module are connected to respective internal ports of one at least one said interface module, whereby the switching module is connected in said intra-node network.

12. The switching node according to claim 11 including a plurality of said switching modules, wherein at least some of the internal ports of each switching module are connected to respective internal ports of a plurality of the interface modules and switching modules in the intra-node network.

13. A switching node, for a data communications network, the switching node comprising a plurality of interface modules for connection data communications links to the switching node wherein:

each interface module comprises at least one external port for connection to the data communications link, a plurality of internal ports, a link interface which is connected to said at least one external port, for processing inbound data for forwarding across the switching node and outbound data for transmission over said data communications link, a switch circuit, which is connected between the link interface and the internal ports of the interface module, for transmission of data between the internal ports of the interface module and between the internal ports and the link interface, and a controller for controlling routing of data via the internal ports of the interface module;

at least some of the internal ports of said each interface module are connected to respective internal ports of one at least one other said each interface module whereby the interface modules are connected in an intra-node network;

and wherein the controller of said each interface module is arranged to control said routing of data in accordance with an intra-node routing protocol governing routing of data across said intra-node network;

wherein the switching node includes at least one switching module comprising a plurality of internal ports, a switch circuit for transmission of data between the internal ports of the switching modules, and a controller for controlling routing of data via the internal ports of the switching module in accordance with said intra-node routing protocol; and at least some of the internal ports of the switching module are connected to respective internal ports of one at least one said interface module, whereby the switching module is connected in said intra-node network;

further including a plurality of said switching modules, wherein at least some of the internal ports of each switching module are connected to restrictive internal ports of a plurality of the interface modules and switching modules in the intra-node network; and wherein the switching circuit of said each interface module comprises an electrical switch, and the switching circuit of the switching module comprises an optical switch.

14. A data communications network comprising:

at least one switching node comprising a plurality of interface modules for connection data communications links to the switching node wherein each interface module comprises at least one external port for connection to the data communication link, a plurality of internal ports, a link interface which is connected to said at least one external port, for processing inbound data for forwarding across the switching node and outbound data for transmission over said data communications link, a switch circuit, which is connected between the link interface and the internal ports of the interface module, for transmission of data between the internal ports of the interface module and between the internal ports and the link interface, and a controller for controlling routing of data via the internal ports of the interface module, wherein the link interface comprises an external routing component for adding external routing information to data to be forward across the switching node in dependence on a destination address indicated by the data to be forwarded, said external routing information indicating an external port of one of said other interface modules of the switching node to which the data is to be forwarded; at least some of the internal ports of said each interface module are connected to respective internal ports of one at least one other said each interface module whereby the interface modules are connected in an intra-node network; and wherein the controller of each interface module is arranged to control said routing of data in accordance with an intra-node routing protocol governing routing of data across said intra-node network; and a plurality of data communications links, connected to respective external ports of the plurality of the interface modules of the switching node, at least one of said data communications links connecting at least one network device to the switching node.

15. An interface card comprising an interface module for connecting a data communications link to a switch node, comprising a plurality of other interface modules, of a data communications network, the interface module comprising:

an external port for connection to the data communications link;

a plurality of internal ports for connection to respective internal ports of said other interface modules of the switching node;

a link interface, connected to the external port, for processing inbound data for forwarding across the switching node and outbound data for transmission over said data communications link;

a switch circuit, connected between the link interface and the internal ports of the interface module, for transmission of data between the internal ports of the interface module and between the internal ports and the link interface; and a controller for controlling routing of data via the internal ports of the interface module in accordance with an intra-node routing protocol governing routing of data across an intra-node network of interconnected interface modules of the switching node;

wherein the controller comprises an internal routing manager for maintaining topology information indicative of the topology of the intra-node network, and an internal routing component for selecting, in dependence on said topology information, the internal port of the interface module for forwarding of data across the intra-node network.

16. A switching node for a data communications network, the switching node comprising a plurality of interface modules for connection data communications links to the switching node wherein:

each interface module comprises at least one external port for connection to the data communications link, a plurality of internal ports, a link interface which is connected to said at least one external port, for processing inbound data for forwarding across the switching node and outbound date for transmisseon over said data communications link, a switch circuit, which is connected between the link interface and internal ports of the interface module, for transmission of data between the internal ports of the interface module and between the internal ports and the link interface, and a controller for controlling routing of data via the internal ports of the interface module, wherein the controller comprises an internal routing manager for maintaining topology information indicative of the topology of the intra-node network, and an internal routing component for selecting, in dependence on said topology information, the internal port of the interface module for forwarding of data across the intra-node network;

at least some of the internal ports of said each interface module are connected to respective internal ports of one at least one other said each interface module whereby the interface modules are connected in an intra-node network;

and wherein the controller of each said interface module is arranged to control said routing of data in accordance with an intra-node routing protocol governing routing of data across said intra-node network.

* * * * *